July 30, 1935.  A. O. FLEET  2,009,654
TRANSPORTATION DEVICE
Filed Jan. 9, 1932   3 Sheets-Sheet 1
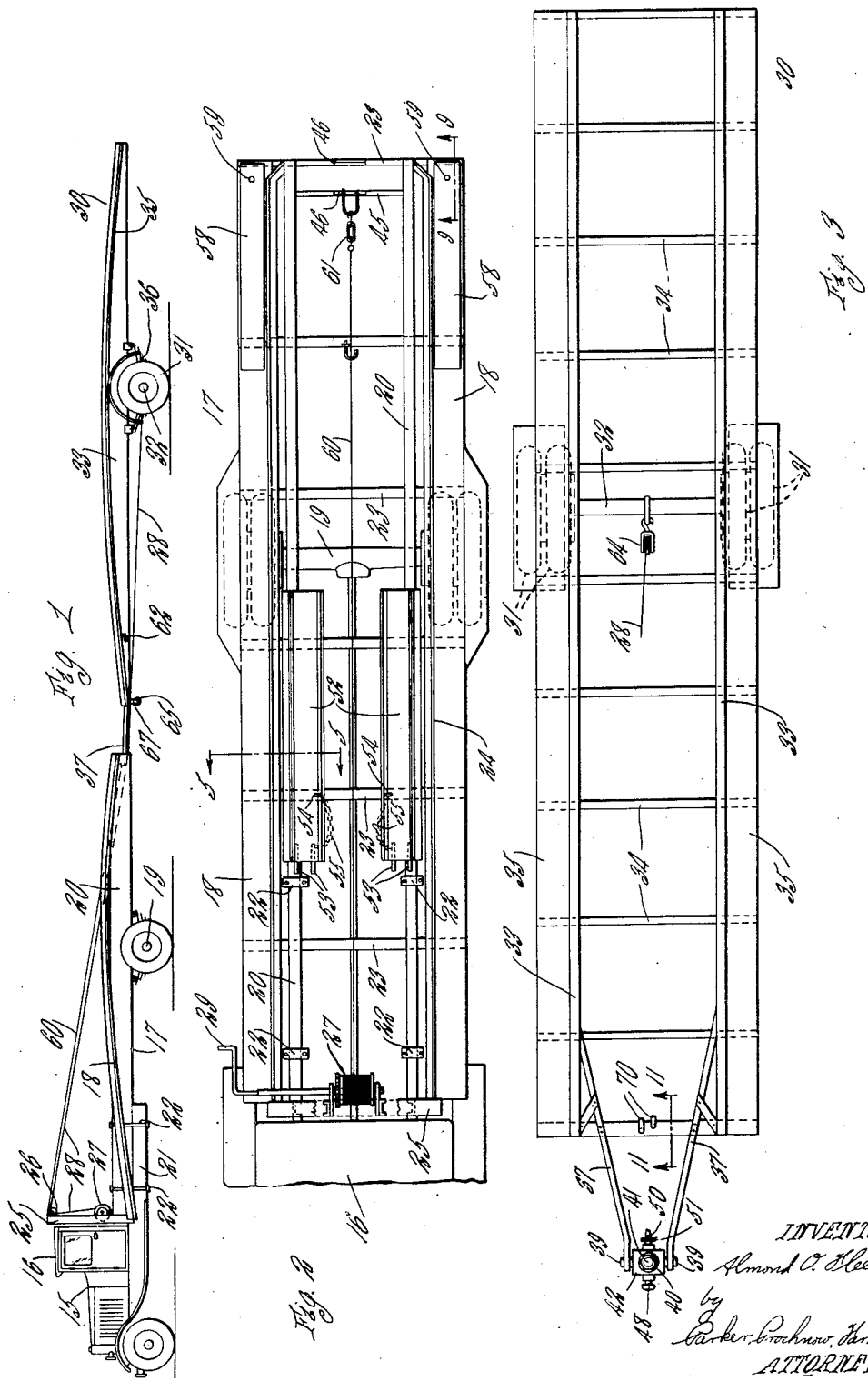

July 30, 1935.　　　A. O. FLEET　　　2,009,654
TRANSPORTATION DEVICE
Filed Jan. 9, 1932　　　3 Sheets-Sheet 2
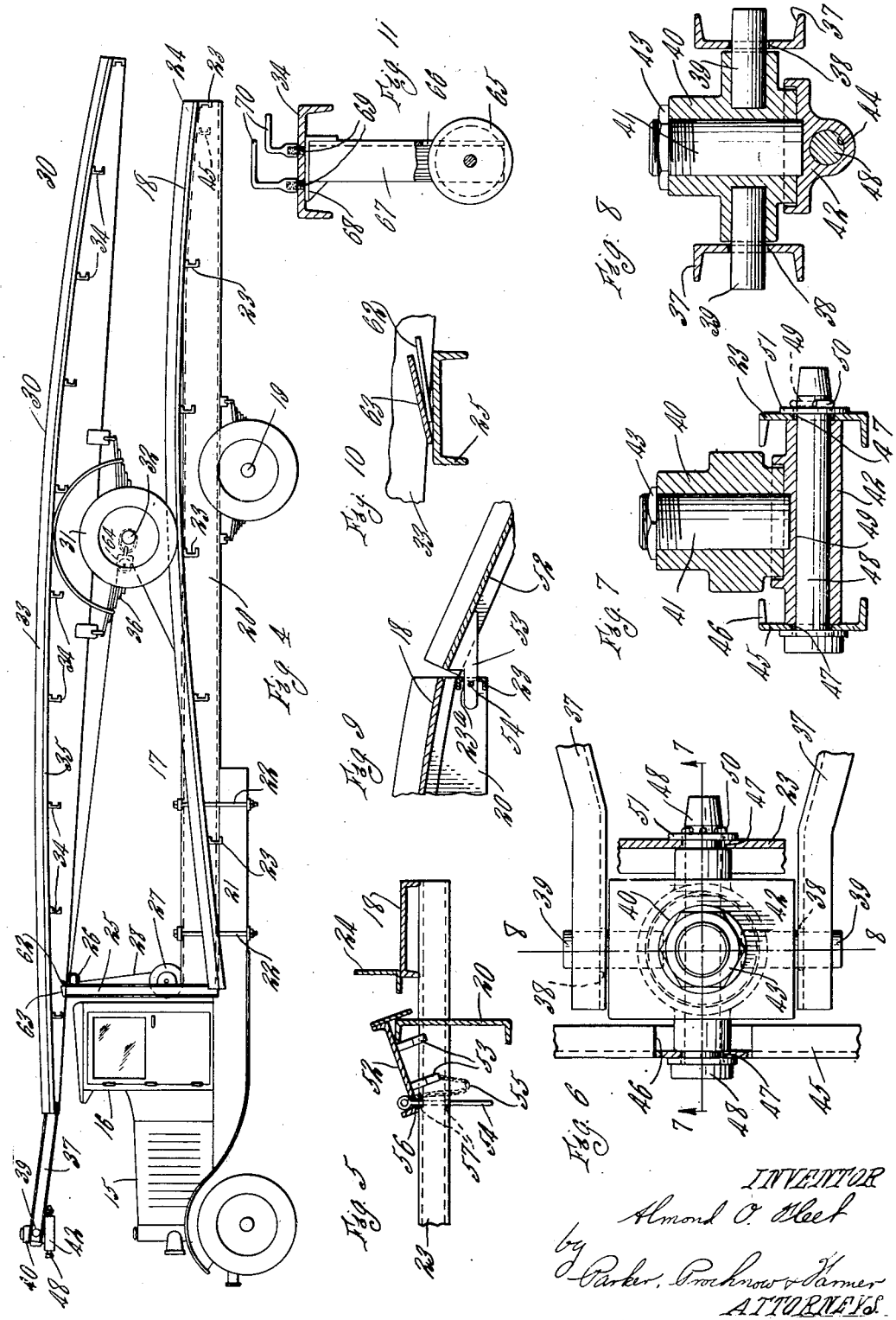

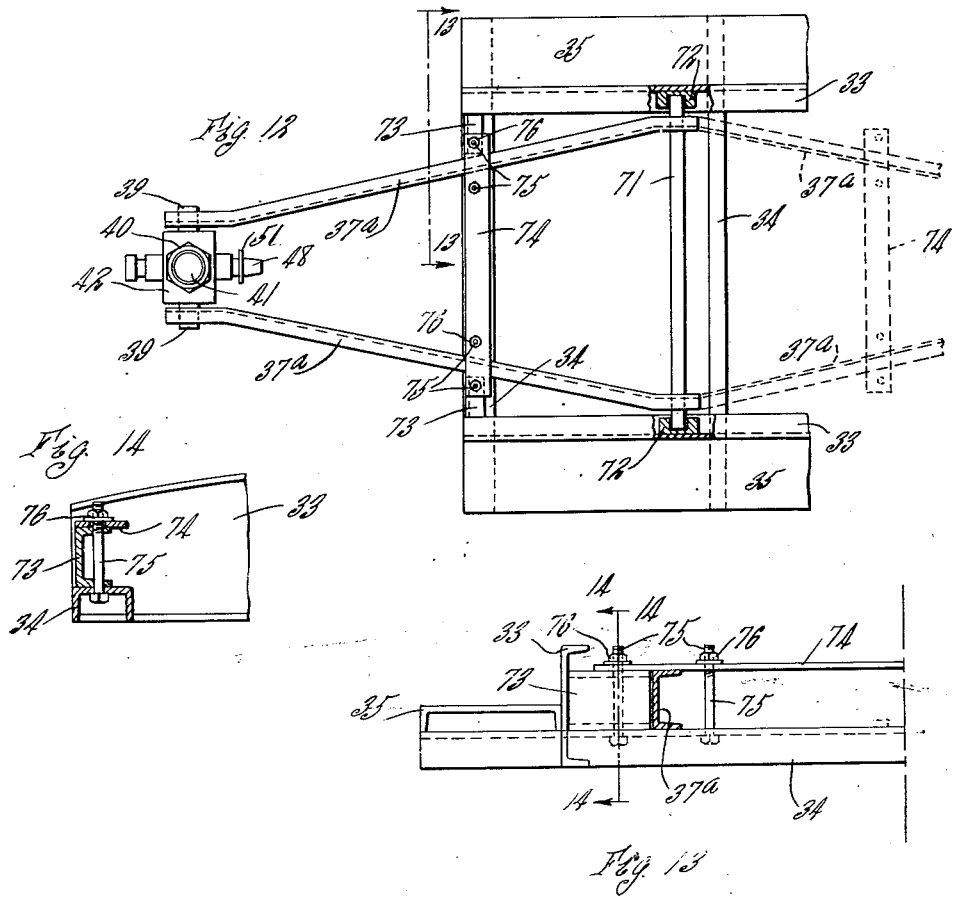

Patented July 30, 1935

2,009,654

UNITED STATES PATENT OFFICE 2,009,654

TRANSPORTATION DEVICE

Almond O. Fleet, Buffalo, N. Y.

Application January 9, 1932, Serial No. 585,748

11 Claims. (Cl. 280—33.1)

This invention relates to transportation devices, and particularly to devices for transporting vehicles without operation thereof on their own running gear. In the transportation of new automobiles, for example, over the highways, it has been common practice to mount such vehicles on trucks and trailers which bodily convey such new vehicles from place to place. When the transporting trucks and trailers are being operated empty, to receive a new load, the heretofore trailer has been hauled unloaded at the rear of the truck or other towing vehicle, and this unnecessarily encumbers the highways, and also creates a traffic hazard by reason of the tendency of an unloaded trailer to bounce, as well as to sway from side to side if the truck and trailer are operated at moderate or high speeds.

An object of this invention is to provide improved means for transporting vehicles, such as new automobiles, from one locality to another by the use of trucks and trailers, and with which the space occupied on the highway by this means when running empty will be reduced; with which the traffic hazard resulting from the use of such trailers will be reduced when the trailer is not loaded and which will be exceptionally simple, practical, convenient and inexpensive.

Another object of the invention is to provide improved means by which vehicles may be transported from one locality to another, by means of trucks and trailers; with which the vehicles to be transported may be easily loaded and unloaded on the trucks and trailers with a minimum of effort and a maximum of safety; with which the trailer may be transported entirely upon the truck when returning for a new load; with which the trailer, when transported on the truck, will be effectively secured against displacement thereon; with which the trailer may be easily loaded or unloaded from the truck with a minimum of labor and effort; with which the truck with trailer mounted thereon for transportation thereby will occupy a minimum of road space; with which the trailer, when not being towed may be shortened in length; and which may be made largely of inexpensive materials.

Another object of the invention is to provide improved means for connecting a towed vehicle to a towing vehicle.

Various other objects and advantages will be apparent from the following description of one embodiment of the invention, and the novel features will be particularly pointed out hereinafter in connection with the appended claims.

In the accompanying drawings:

Fig. 1 is a side elevation of a truck and trailer constructed in accordance with this invention for the support and transportation of vehicles, such as new automobiles, but with the cables connected in the manner employed when the trailer is to be loaded upon the truck;

Fig. 2 is a plan of part of the truck;

Fig. 3 is a plan of the trailer;

Fig. 4 is a side elevation of the truck and trailer, when the trailer is mounted on the truck for transportation thereby;

Fig. 5 is a fragmentary, transverse sectional elevation, with its section taken approximately along the line 5—5 of Fig. 2;

Fig. 6 is a plan, partly in section, of the universal connection between the truck and the trailer;

Fig. 7 is a sectional elevation through the universal coupling, the section being taken approximately along the line 7—7 of Fig. 6;

Fig. 8 is another sectional elevation through the universal coupling, with the section taken approximately along the line 8—8 of Fig. 6;

Fig. 9 is a sectional elevation through the rear end of the truck and a track skid connected thereto, such a section being taken along the line 9—9 of Fig. 2 when the loading skids are in position for loading;

Fig. 10 is a sectional elevation of the details by which the forward end portion of the trailer is steadied by the truck when the trailer is mounted on the truck, as shown by Fig. 4;

Fig. 11 is a sectional elevation of part of the forward end of the trailer, the section being taken approximately along the line 11—11 of Fig. 3;

Fig. 12 is a plan of the forward end of a trailer, also constructed in accordance with this invention but illustrating a modified construction, by which the overall length of the trailer may be shortened when the trailer is being transported upon a truck in the manner shown in Fig. 4;

Fig. 13 is a transverse, sectional elevation of part of the same, the section being taken approximately along the line 13—13 of Fig. 12; and Fig. 14 is a sectional elevation of the same; the section being taken approximately along the line 14—14 of Fig. 13.

In the embodiment of the invention illustrated in Figs. 1 to 11, a truck 15 (Figs. 1, 2 and 4) is provided with a cab 16, and rearwardly of the cab is provided with a long truck body or frame 17 having at the sides thereof a pair of tracks 18 along which vehicles to be transported may be rolled, and while mounted thereon transported from one locality to another. The rear axle 19 of the truck is spaced well forwardly from the rear end of the truck, so that a considerable proportion of the load will be carried by the rear wheels of the truck.

The truck is preferably provided with two girders or beams 20 which form rearward extensions for the regular truck frame 21 (Fig. 4), the girders or beams 20 being coupled to the regular frame members 21 of the truck in any suitable manner, such as by clamping devices 22. The girders 20 extend from the cab rearwardly the entire length of the truck and are connected by a plurality of cross bars 23, which are structural steel members or beams. In the illustrated truck, they are channel bars disposed on edge and extending through U-shaped openings formed in the vertical walls or webs of the girders 20 of the frame. The cross beams or bars 23 project sidewise beyond the girders 20, and the tracks 18 are mounted on the projecting ends of the cross beams, as shown clearly in Figs. 2 and 5.

Each track 18 has an upstanding flange 24 along its inner edge to guide the wheels of the vehicle, which is being moved along the tracks 18, into the desired position on the truck, and to prevent sidewise displacement of the vehicle on the tracks. The tracks 18 may be of channel shape, with the channel inverted, and the flanges 24 are secured in any suitable manner, such as by welding, to the channel bars 18. The tracks 18 are secured in any suitable manner, such as by welding, to the ends of the cross beams 23 and the latter in turn may be welded to the girders 20 through which they pass, so as to form a very rigid and strong construction. By placing the cross beams 23 at different vertical positions in the webs of the girders 20, the tracks 18 may be given some upward convexity or camber, so as to provide a slight crest between the ends of the tracks and preferably somewhat to the rear of the mid-length of the tracks 18.

A hoist bench or frame 25 is provided on the truck frame immediately at the rear of the cab 16, and this bench or frame rises to or above the top of the cab, as shown in Figs. 1 and 4. This frame or bench may be in the form of an inverted U-frame and at its top is provided with a sheeve 26. A winch 27 is mounted on the truck frame at any suitable point, such as at the base of the frame or bench 25, and may be of any suitable or desired construction. This winch includes a cable drum upon which is wound a cable 28 (Fig. 4) and the drum is rotated and controlled by suitable mechanism including a crank arm 29 (Fig. 2). Winches of this type are well known. The cable 28 passes over the sheeve 26 and then extends rearwardly along the truck.

The trailer 30 is provided with a running gear including two sets of wheels 31 on opposite ends of an axle 32, and the trailer body includes a pair of girders or beams 33 spaced apart side by side and connected by a plurality of cross beams 34. The girders 33 are similar to the truck girders 20, and both girders of the truck and trailer may have sections of the web near the ends thereof taken out, and the remaining sections of the web, where the section was removed, welded together to provide the curvature at the rearward end of the truck girders 20, and at both ends of the trailer girders 33. In this manner, and by arranging the cross beams 34 at different positions in the webs of the girders, an upward convexity or camber in the tracks of the trailer and truck may be given. In the trailer, the tracks 35, Figs. 4 and 13, are disposed against the webs of the girders so that the girder webs will serve as the guide flanges for the tracks.

The tracks 35 of the trailer may also be formed of inverted shallow channel bars running endwise of the trailer. The tracks 35 are welded to the cross beams 34 and to the webs of the channel 33, and the cross beams may be welded to the girders through which they extend, the same as explained for the truck body. The girders 33 of the trailer are connected to the axle 32 by suitable vehicle springs 36, the axle is disposed slightly to the rear of the mid-length of the girders 33, and the crest of the camber of the tracks of the trailer are approximately over the axle.

A pair of arms 37 are secured to the forward end of the trailer frame, as shown in Fig. 3, converge forwardly toward one another, and have their free ends bent parallel to one another to form part of a universal coupling by which the trailer may be connected to the rear end of the truck. This universal coupling is shown in Figs. 6 to 8. The arms 37 may be formed of channel bars, and adjacent their free ends are provided with aligned apertures 38 which rotatably receive a pair of pins 39 which extend in opposite directions from a hub 40 to which the pins are secured, such as by welding. The hub 40, in turn, is rotatably mounted on a stud or king pin 41 which extends upwardly from the member 42 and is preferably welded thereto. The hub is removably confined on the stud or pin 41 by means of a nut 43 threaded upon the free end of the stud.

The member 42 is provided with a passage 44 which extends in a direction crosswise of the axis of the stud 41. The member 42 is adapted to descend between a pair of frame members extending crosswise of the rear end of the truck and spaced apart slightly in a direction forwardly and rearwardly of the truck, as shown in Figs. 4 and 6. One of these cross bars may be the cross beam 23 at the extreme rear of the truck frame, and the other cross bar may be a special cross bar 45 extending between and connecting the girders. Both of these cross bars are shown as of channel shape with the webs vertical, and the upper flange of each may be notched or cut away as at 46, Figs. 2 and 6, to allow the member 42 to descend into a position between the frame members. These two cross bars are provided with aligned apertures 47 in their webs, Figs. 6 and 7, to receive a coupling pin 48 which also passes through the passage 44 of the coupling member 42, as shown in Figs. 6 to 8.

One end of the coupling pin 48 is provided with a head, and the other end is provided with a transverse passage 49 to receive a cotterpin 50 which, with a washer 51, prevents accidental removal of the coupling pin. The coupling pin 48 thus extends in a direction forwardly and rearwardly of the truck, and this permits of a lateral rocking movement of the member 42 and the parts 41, 40, 39 and 37 which are connected thereto. Thus, the trailer may rock or roll sidewise to a limited extent by reason of the pivotal connection to the pin 48. This sidewise rocking or rolling of the trailer is caused by unevenness in the roadway, or by reason of one wheel only of the trailer hitting an obstruction on the roadway.

When turning a corner, the trailer is allowed to follow in the normal manner, since the hub 40 connected to the forward arms 37 of the trailer can rock about the vertical stud or king pin 41. The trailer may also move upwardly and downwardly with respect to the truck by reason of the pivotal connection of the arms 37 of the trailer to the pins 39 which extend in a direction crosswise of the roadway. It will be observed that a very simple and practical universal coupling has been provided between the trailer and the truck which will permit of disconnection of the trailer merely by removal of the coupling pin 48, and which will allow universal movement between the trailer and truck without lost motion.

A pair of skids 52, Figs. 2, 5, and 9, are provided for use at the rear ends of both the trailer and the truck, so as to guide vehicles upon both the truck and trailer. Each skid may, for convenience, comprise a channel bar having a pair of tongues 53 extending therefrom adjacent one end thereof and at an angle thereto. The rear cross beam 23 of the truck frame is also provided with apertures or slots 23a which receive the arms or projections 53 and support the skids with the webs thereof approximately meeting the track 18 of the truck at the rear end, as shown in Fig. 9. The other ends of the skids rest upon the ground, and the skids thus provide inclined runways from the ground to the rear ends of the tracks 18.

The rear end of the trailer may be provided with similar slots for attaching the skids thereto in a similar manner when vehicles are to be loaded upon the trailer at the rear end thereof. Pins 54 may be passed through suitable apertures in the arms 53 on the opposite sides of the rear cross bar or beam 23 from the skids, when the skids are assembled, as shown in Fig. 9, so as to prevent disconnection of the skids from the truck frame while in use.

The pins 54 are secured to the skids by flexible chains 55, so that the pins cannot become lost, and the same pins serve as convenient means for attaching the skids to the truck frame when not in use, as shown in Figs. 2 and 5. When not in use, the skids are detached from the rear of the truck and placed between the tracks on the cross beams 23. Each skid is provided with an aperture 56 in the web that the pin may be passed through the aperture 56 and through an aperture 57 in one of the cross beams, as illustrated particularly in Figs. 2 and 5.

When the trailer is coupled to the truck, as shown in Fig. 1, the skids 52 may be coupled to the rear end of the trailer, and the vehicles to be transported operated up the skids and upon the trailer, either under their own power or with the assistance of the cable 28 from the sheeve 26. The vehicles, after being mounted on the trailer, may be run forwardly and transferred to the truck tracks, and for this transfer, a pair of plates or beams 58 (Fig. 2) may be placed as bridges across the tracks between the rear end of the truck and the forward end of the trailer. These plates or beams, when not used, may be secured to any suitable part of the truck, or as shown in Fig. 2, upon the rear ends of the tracks 18, displacement being prevented by clamping pins or bolts 59 which pass through suitable apertures in the plates and in the web of the track.

When the truck and trailer are returning empty for a new load, it is unnecessary to draw the trailer idly behind the truck. When the trailer is unloaded, it tends to bounce and snap from side to side of the road, and occupies an unnecessarily large amount of the road, thereby creating a traffic hindrance and hazard. Power to haul the trailer by towing is also required, whereas less power would be required if the trailer were mounted on the truck. Accordingly, I prefer to mount the trailer on the truck while returning for a new load, and this is accomplished in a manner which will now be explained.

A guide wire or cable 60 (Figs. 1 and 2) is stretched between the top of the hoist bench 25 (Fig. 1), and the frame member 45 at the rear end of the truck, and is stretched relatively taut by a turn-buckle 61. The skids 52 are coupled to the rear end of the truck, as shown in Fig. 9, the trailer of course being disconnected at this time from the truck by reason of the removal of the coupling pin 48 from the universal coupling. The cable 28 from the sheeve 26 is carried beyond the rear end of the truck and below the trailer body, and is connected to the trailer axle 32. The forward end of the trailer is tilted upwardly somewhat and guided above the rear end of the truck while the cable 28 is wound upon the winch.

The winding up of the cable 28 draws the trailer forwardly, then up the skids and upon the track of the truck, and then forwardly, upon the tracks 18 provided on the truck, into the position shown in Fig. 4. The cable 60 guides the forward end of the trailer upwardly into a position above the cab, as shown in Fig. 4. Tongues or projections 62 (Figs. 4 and 10) are provided on the sides of the trailer frame below the tracks 35, and near the forward end of the trailer frame, and these tongues or projections 62 engage beneath the flanges or catches 63 mounted upon the top of the hoist bench 25. The flanges 63 are inclined forwardly and downwardly, so that as the tongues or projections 62 engage thereunder, they will be cammed downwardly against the top of the hoist bench, and will be locked against further forward, sidewise and vertical movement. This serves to anchor the forward end of the trailer frame effectively to the hoist bench of the truck, and the rearward movement of the trailer is prevented by the cable 28.

After the trailer has been pulled into the position shown in Fig. 4, the cable 28 may be connected in the manner shown in Fig. 4, in which a sheeve 64, through which the cable 28 passes, is hooked to the axle 32 of the trailer, and the free end of the cable is then hooked to a suitable part of the truck frame somewhat forwardly from the axle 32. Tightening of the cable then ties the axle 32 of the trailer to the truck body and prevents rearward movement of the trailer as well as offering some resistance to the vertical movement of the trailer at the axles. If desired, other means such as ropes or cables may be employed to tie the rear end of the trailer to the rear end of the truck and prevent vertical bouncing of the trailer on the truck body. The guide cable 60 may be slacked off or removed so as to clear the axle of the trailer as soon as the trailer starts forwardly upon the truck body and after the forward end of the trailer has moved above the hoist bench or cab.

In order to aid in guiding the forward end of the trailer along the guide cable 60, a grooved roller 65 may be provided on the forward end of the trailer, so as to depend therefrom, the position of this roller 65 being shown in Figs. 1 and 11. This roller 65 is mounted in a slot 66 in the lower end of a channel strip 67 depending from and removably clamped to the web of a cross bar 34 at the forward end of the trailer. For this purpose, the channel strip 67 may be provided with a plate 68 at its upper end and this plate carries threaded studs 69 which project through apertures in the beam 34. Nuts 70 may be threaded on the studs 69 above the beam 34 so as to secure the channel strip 67 removably to the under side of the cross beam. Each of the nuts 70 has an angular handle, and one of the handles is nearer the body of the nut than the handle on the other nut, so that the nut with the lowest handle may be first threaded to a stud and then the other nut applied. The arrangement, when the second nut is applied, is shown in Fig. 11.

It will be noted that when the trailer is mounted on the truck, as shown in Fig. 4, the road space occupied by both trailer and the truck is very little, if any, more than that occupied by the truck alone, and the height of the combined truck and trailer is still not excessive. At the completion of a return trip, and when it is desired to use the trailer for transporting vehicles, the skids are again applied to the rear end of the truck, and the cable 28 is reconnected between the trailer axle and truck body in a slightly different manner. At this time, the cable 28 is hooked at its free end to the trailer axle 32, and the pulley or sheeve 64 is connected to a cross beam of the truck body frame just slightly in the rear of the crest in the tracks of the truck frame.

If now the winch 27 is operated, it will pull the trailer rearwardly on the truck frame, disengaging the tongues or projections 62 from the flanges 63. As soon as the wheels of the trailer pass the point of anchorage of the pulley 64 to the truck frame, the cable will then retard the rearward movement of the trailer on the truck frame and is unwound slowly as the trailer descends the slightly inclined tracks on the rear side of the crest. With this arrangement the trailer may be allowed to descend slowly over the skids to the ground. As soon as the trailer moves far enough to the rear to permit, roller 65 is applied to the trailer frame, and the guide cable 60 is of course preferably reconnected from the top of the hoist bench to the rear end of the truck so as to engage with the pulley or roller 65 and guide the forward end of the trailer, which is slightly overbalanced, as the trailer descends to the ground.

If desired, as soon as the trailer has been pulled over the crest on the truck tracks in an unloading direction, the wheels of the trailer may be blocked temporarily, and the pulley or sheeve 64 disconnected from the truck frame. The free end of the cable is then connected to the truck frame, and pulley 64 is connected to the axle as shown in Fig. 4, after which the blocks may be removed from the trailer wheels, and the trailer allowed to descend to the ground by the unwinding of the cable 28 under the control of the winch 27. The free end of cable 28 may instead be connected directly to the trailer axle, so as to control its descent directly instead of as shown in Fig. 4.

After the trailer is unloaded, it will of course be reconnected to the rear end of the truck, by lowering the forward end of the trailer and causing the universal coupling parts to descend between the cross frame bars 23 and 45 at the rear end of the truck. The coupling pin 48 is then inserted, as shown in Figs. 6 to 8, which couples the trailer to the truck frame. The guide cable 60 is then slacked off or removed and the cable 28 disconnected from the trailer, whereupon the truck and trailer are ready to receive a new load of vehicles to be transported thereon.

It may be desirable at times to shorten the length of the trailer as much as possible while it is being transported on the truck, and I have illustrated in Figs. 12 to 14, certain changes in the trailer construction which permit of such shortening. Referring now to Figs. 12 to 14, the arms 37a which extend forwardly from the trailer and carry the universal coupling parts, instead of being rigidly connected to the forward end of the trailer frame as in Figs. 1 to 11, are secured to a shaft 71 which extends between and connects the arms 37a. The shaft 71 is pivoted at its projecting ends in suitable bearing blocks 72 which are provided on the inside faces of the webs of the girders 33 of the trailer frame adjacent to the forward end thereof but spaced somewhat rearwardly from said forward end, as shown in Fig. 12. The arms 37a are thus hinged to the trailer frame and may swing upwardly and downwardly thereon.

The arms 37a pass above the forward cross beam 34 of the trailer frame, and this cross beam limits the downward movement of the arms 37a with respect to the trailer frame. Short channel strips 73 are secured to the forward cross beam 34 of the trailer frame at the inner side of each longitudinal girder 33, and each channel strip is disposed on edge, as shown in Fig. 14. The width of each piece of channel bar 73 is the same as the width of the arms 37a (see Fig. 13). A plate or bar 74 extends across the tops of the arms 37a where they cross the forward cross beam 34 of the trailer frame, and this plate 74 may be permanently secured, such as by welding, to the arms 37a. The plate 74 thus moves upwardly and downwardly with the arms 37a and serves to stiffen and reinforce them.

When the arms 37a are swung downwardly until they strike the forward cross beam 34 of the trailer, the plate 74 will fit against the upper side of each piece of channel bar 73. The plate 74 is removably clamped in this position so as to form a rigid connection between the trailer frame and the arms 37a. For this purpose, bolts 75 are passed upwardly through the forward cross beam 34 of the trailer frame, and through apertures in the plate 74, on each side of an arm 37a, and carry nuts 76, which removably clamp the plate 74 to the trailer frame. The bolts 75 may be welded to the frame, so as to constitute threaded studs which project from the trailer frame. For convenience, one of these bolts 75, at each side of the trailer frame, may also pass upwardly through the adjacent piece of channel bar 73.

When the plate 74 is clamped to the trailer frame by the nuts 76, the arms 37a are rigidly clamped to the trailer frame, and function in the same manner as the arms 37 of Figs. 1 to 10. When the trailer is mounted on the truck, as shown in Fig. 4, the arms 37 and 37a extend forwardly over the hood of the truck, and in the embodiment shown in Figs. 12 to 14, the nuts 76 may be removed to release the arms 37a, after which the latter may be swung upwardly and rearwardly on the trailer frame, so as to lie flat against the upper face of the trailer frame. By so swinging the arms 37a on the trailer frame, the effective overall length of the trailer frame is quite considerably shortened, and it is possible to transport a longer trailer on the truck, when the arms 37a are pivoted in this manner.

The use of the apparatus which has been herein described and illustrated should be clear from the foregoing description, and it will be observed that the truck and trailer frames may be formed of structural steel, and being of skeleton form are relatively light in weight.

It will also be observed that various changes in the details and arrangements of parts, which have been herein described and illustrated in order to explain the nature of the invention, may be made by those skilled in the art within the principle and scope of the invention as expressed in the appended claims.

I claim as follows:

1. A device for transporting vehicles, comprising a truck having thereon tracks, each with a crest between the ends thereof, upon which the vehicles to be transported may be run and transported while thereon, skid members detachably connectable to the rear of the truck in alignment with the tracks thereof and resting at their free ends upon the ground to form loading runways, for the tracks, a winch carried by the truck and having a cable detachably connectable to any vehicle to be loaded, a guide for the section of said cable between the vehicle and the winch, located adjacent and above the forward ends of the tracks, for pulling any vehicle up said skids and along said tracks, and a second guide releasably engaging the section of cable between the vehicle and said first guide and connected to said truck at the rear of the connection of said cable to the loaded vehicle for drawing said vehicle over said crests when said vehicle is to be unloaded.

2. A device for transporting vehicles, comprising a truck having a cab and tracks extending from the cab to the rear end, a two wheel trailer, of greater length than the tracks on the truck, and having its wheels approximately midway of its length, said trailer being detachably and articulately connected at one end to the rear of said truck means carried by said truck for drawing said trailer upon said truck tracks, whereby said trailer, when no vehicles are being transported thereon, may be detached from the rear of the truck and mounted on the tracks of said truck, with one end of the trailer extending above said cab, and means acting between an end of said trailer and said truck, when said trailer is mounted on said truck, for anchoring and steadying said trailer at an end thereof.

3. A device for transporting vehicles, comprising a truck having a cab and tracks extending from the cab to the rear end, a two wheel trailer, of greater length than the tracks on the truck, detachably and articulately connected at one end to the rear of said truck and having tracks thereon for mounting vehicles to be transported, whereby said trailer, when no vehicles are being transported, may be detached from the rear of the truck and mounted on the tracks of said truck, with one end of the trailer extending above said cab, and means disposed on said truck at approximately the top of said cab and engaging and steadying the adjacent end of a trailer mounted on said truck tracks.

4. A device for transporting vehicles, comprising a truck having a cab and tracks extending from the cab to the rear end, a two wheel trailer, of greater length than the tracks on the truck, detachably and articulately connected at one end to the rear of said truck and having tracks thereon for mounting vehicles to be transported, whereby said trailer, when no vehicles are being transported, may be detached from the rear of the truck and mounted on the tracks of said truck, with one end of the trailer extending above said cab, means disposed on said truck at approximately the top of said cab and engaging and steadying the adjacent end of a trailer mounted on said truck tracks, and a winch device on said truck and including a cable and a cable guide at approximately the top of the cab, for guiding said cable rearwardly of the truck from said cab for pulling a vehicle upon said truck tracks or letting it down those tracks.

5. A device for transporting vehicles, comprising a truck having a cab and tracks extending from the cab to the rear end, a two wheel trailer, of greater length than the tracks on the truck, detachably and articulately connected at one end to the rear of said truck and having tracks thereon for mounting vehicles to be transported, whereby said trailer, when no vehicles are being transported, may be detached from the rear of the truck and mounted on the tracks of said truck, with one end of the trailer extending above said cab, means disposed on said truck at approximately the top of said cab and engaging and steadying the adjacent end of a trailer mounted on said truck tracks, and a guide cable extending from approximately the top of said cab to the rear of said truck at approximately the level of said tracks thereon, for guiding one end of said trailer into a position above said cab while said trailer is being placed on said truck tracks from the rear thereof.

6. A device for transporting vehicles, comprising a truck having a cab and tracks extending from the cab to the rear end, a two wheel trailer, of greater length than the tracks on the truck, detachably and articulately connected at one end to the rear of said truck and having tracks thereon for mounting vehicles to be transported, whereby said trailer, when no vehicles are being transported, may be detached from the rear of the truck and mounted on the tracks of said truck, with one end of the trailer extending above said cab, means disposed on said truck at approximately the top of said cab and engaging and steadying the adjacent end of a trailer mounted on said truck tracks, and a guide cable extending from approximately the top of said cab to the rear of said truck at approximately the level of said tracks thereon, for guiding one end of said trailer into a position above said cab while said trailer is being placed on said truck tracks from the rear thereof, said cable being collapsible to enable its being slackened out of obstructing position at any time when its use is not desired.

7. A device for transporting vehicles, comprising a truck having a cab and tracks extending from the cab to the rear end, a two wheel trailer detachably and articulately connected at one end to the rear end of said truck and having tracks thereon for mounting vehicles to be transported thereon, whereby said trailer, when no vehicles are being transported by it or said truck, may be detached from the rear of said truck and mounted on the tracks of said truck, with one end of the trailer extending forwardly above said cab, a tongue carried by said trailer, and a pocket carried by said truck at approximately the top of said cab, for receiving said tongue as said trailer moves forwardly on the truck tracks and anchoring the forward end of said trailer against sidewise and further forward movement.

8. A device for transporting vehicles comprising a truck having a cab and tracks extending from approximately at the cab to the rear end, a frame arising from the truck, at the forward ends of said tracks, to approximately the top of said cab, a sheeve secured to the upper part of said frame, a winch disposed on said truck, a cable running from said winch over said sheeve, and then rearwardly of the truck for attachment to a vehicle to be loaded or unloaded, skids detachably connected to the rear end of the truck, up which a vehicle to be transported may be pulled, and then along said tracks by attachment of the free end of said cable to said vehicle and the operation of said winch, and a cable guide carried by the rearward section of said truck, around which the section of said cable between the end attached to a vehicle on the truck and said sheeve may be passed when one desires to move the vehicle rearwardly upon the truck by operation of said winch.

9. A device for transporting vehicles, comprising a truck having a cab and tracks extending from approximately the cab to the rear end thereof, a two wheel trailer detachably and universally connected at one end to the rear end of said truck and having tracks thereon for mounting vehicles to be transported thereon, a frame carried by said truck at the forward ends of said tracks and rising to a level approximately at the top of said cab, a guide cable stretched between the top of said frame and the rear end of said truck, and a guide part carried by said trailer adjacent its forward end for engaging the said guide cable when said trailer is pulled upon said truck from the rear of said truck, so as to guide the forward end of said trailer into a position above said cab, said guide cable being formed or slackening when not in use, so as to permit further forward movement of said trailer or the mounting of other vehicles on the truck.

10. A device for transporting vehicles, comprising a truck having a cab and tracks extending from approximately the cab to the rear end thereof, a two wheel trailer detachably and universally connected at one end to the rear end of said truck and having tracks thereon for mounting vehicles to be transported thereon, a frame carried by said truck at the forward ends of said tracks and rising to a level approximately at the top of said cab, a guide cable stretched between the top of said frame and the rear end of said truck, and a guide part carried by said trailer adjacent its forward end for engaging the said guide cable when said trailer is pulled upon said truck from the rear of said truck, so as to guide the forward end of said trailer into a position above said cab, said guide cable being formed for slackening when not in use, so as to permit further forward movement of said trailer or the mounting of other vehicles on the truck, said frame on the truck and a portion of said trailer having parts interengageable with one another as the forward end of the trailer passes over said cab for tying the forward end of said trailer to said truck and restricting its lateral movement.

11. A device for transporting vehicles, comprising a truck having a cab and tracks extending from approximately the cab to the rear end thereof, a two wheel trailer detachably and universally connected at one end to the rear end of said truck and having tracks thereon for mounting vehicles to be transported thereon, a frame carried by said truck at the forward ends of said tracks and rising to a level approximately at the top of said cab, a guide cable stretched between the top of said frame and the rear end of said truck, a guide part carried by said trailer adjacent its forward end for engaging the said guide cable when said trailer is pulled upon said truck from the rear of said truck, so as to guide the forward end of said trailer into a position above said cab, said guide cable being formed for slackening when not in use, so as to permit further forward movement of said trailer or the mounting of other vehicles on the truck, a pocket mounted on the top of said frame and open from the rear, and a tongue carried by the forward portion of said trailer and receivable in said pocket when said trailer is pulled forwardly on the truck tracks with the forward end of the trailer passing over said cab.

ALMOND O. FLEET.